US010038757B2

(12) United States Patent
Madiraju et al.

(10) Patent No.: US 10,038,757 B2
(45) Date of Patent: Jul. 31, 2018

(54) PROVIDING PERSONALIZED GREETINGS ON A DIGITAL ASSISTANT

(71) Applicant: MICROSOFT TECHNOLOGY LICENSING, LLC, Redmond, WA (US)

(72) Inventors: Sasanka Madiraju, Hyderabad (IN); Ayman Farouq Mohammad Almadhoun, Bellevue, WA (US); Nirav Ashwin Kamdar, Hyderabad (IN); Talon Edward Ireland, Kirkland, WA (US); Melissa Nicole Lim, Seattle, WA (US); Ravikiran Arun Aranke, Hyderabad (IN); Catherine Lynn Maritan, Ottawa (CA); Tudor Buzasu Klein, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 14/747,941

(22) Filed: Jun. 23, 2015

(65) Prior Publication Data

US 2016/0321263 A1    Nov. 3, 2016

(30) Foreign Application Priority Data

Apr. 29, 2015   (IN) .......................... 2194/CHE/2015

(51) Int. Cl.
    *G06F 17/30*      (2006.01)
    *H04L 29/08*      (2006.01)
    *G06Q 10/10*      (2012.01)
(52) U.S. Cl.
    CPC ...... *H04L 67/306* (2013.01); *G06F 17/30522* (2013.01); *G06Q 10/109* (2013.01)

(58) Field of Classification Search
    CPC ............ H04L 67/306; G06F 17/30522; G06Q 10/109
    (Continued)

(56) References Cited

U.S. PATENT DOCUMENTS 5,812,950 A    9/1998   Tom
7,123,696 B2   10/2006  Lowe
(Continued)

FOREIGN PATENT DOCUMENTS

WO    03044703 A1    5/2003
WO    03073417 A2    9/2003
(Continued)

OTHER PUBLICATIONS

"Second Written Opinion Issued in PCT Application No. PCT/US2016/029640", dated Mar. 7, 2017, 4 Pages.
(Continued)

*Primary Examiner* — Evan Aspinwall
(74) *Attorney, Agent, or Firm* — Shook, Hardy & Bacon L.L.P.

(57) ABSTRACT

Methods and systems are provided for generating personalized greetings for presentation by a personal digital assistant on a client device. An indication is received from the client device associated with the user that the personal digital assistant has been launched on the client device. User-specific information and contextual information is retrieved by querying a user profile database and one or more services. A personalized greeting engine utilizes the user-specific information, such as user inferences and interests, and the contextual information to generate the personalized greetings for presentation by the digital assistant on the client device.

20 Claims, 5 Drawing Sheets

(58) Field of Classification Search
USPC ........................................................ 707/732
See application file for complete search history.

(56) References Cited

U.S. PATENT DOCUMENTS

| | | | |
|---|---|---|---|
| 7,542,552 | B2 | 6/2009 | Korah et al. |
| 8,000,453 | B2 | 8/2011 | Cooper et al. |
| 8,111,813 | B2 | 2/2012 | Weber et al. |
| 8,509,395 | B1 | 8/2013 | Crawford |
| 8,972,574 | B2 | 3/2015 | Mansfield et al. |
| 2009/0157653 | A1* | 6/2009 | Herlocker .......... G06F 17/30867 |
| 2009/0234815 | A1* | 9/2009 | Boerries ............ G06F 17/30867 |
| 2010/0205061 | A1* | 8/2010 | Karmarkar ............ G06Q 30/02 705/14.64 |
| 2013/0080911 | A1 | 3/2013 | Klemm |
| 2013/0275164 | A1* | 10/2013 | Gruber .................... G10L 17/22 705/5 |
| 2013/0325971 | A1 | 12/2013 | Winer |
| 2014/0136993 | A1 | 5/2014 | Luu et al. |
| 2014/0253455 | A1* | 9/2014 | Mauro .................... G06F 3/167 345/169 |
| 2016/0285816 | A1* | 9/2016 | Schmid .............. G06Q 30/0631 |

FOREIGN PATENT DOCUMENTS

| | | |
|---|---|---|
| WO | 2007002448 A1 | 1/2007 |
| WO | 2014111951 A2 | 7/2014 |

OTHER PUBLICATIONS

Ion, Florence, "Review: Indigo Wants to Bring Siri-Like Conversation to the Android Platform", Published on: Jun. 5, 2013, Available at: http://arstechnica.com/gadgets/2013/06/review-indigo-brings-siri-like-conversation-to-the-android-platform/.

Warren, Tom, "Apple Has Siri, and Microsoft is About to Get Cortana", Published on: Feb. 20, 2014, Available at: http://www.theverge.com/2014/2/20/5430188/microsoft-cortana-personal-digital-assistant-windows-phone-8-1.

"Gimbal", Published on: Dec. 17, 2014, Available at: http://www.gimbal.com/.

Kamal, "This is how Cortana will Greet You! Cortana's Icon Pack Extracted Language Change Possible", Published on: Feb. 19, 2014, Available at: http://www.nokiapoweruser.com/this-is-how-cortana-will-greet-you-cortanas-icon-pack-extracted-language-change-possible/.

"International Search Report and Written Opinion Issued in PCT Application No. PCT/US2016/029640", dated Jul. 14, 2016, 13 Pages.

"International Preliminary Report on Patentability Issued in PCT Application No. PCT/US2016/029640", dated May 31, 2017, 7 Pages.

* cited by examiner

PROVIDING PERSONALIZED GREETINGS ON A DIGITAL ASSISTANT

CROSS-REFERENCE TO RELATED APPLICATIONS

This application claims priority to Indian Patent Application having Application No. 2194/CHE/2015 filed in India on Apr. 29, 2015, entitled "PROVIDING PERSONALIZED GREETINGS ON A DIGITAL ASSISTANT," which is incorporated herein by reference in its entirety.

BACKGROUND

A personal digital assistant program provides services traditionally provided by a human assistant. For example, a personal digital assistant can update a calendar, provide reminders, track activities, and perform other functions. Some personal digital assistant programs can respond to voice commands and audibly communicate with users. Traditionally, personal digital assistants have greeted users with impersonal messages, which fail to replicate a human-like experience.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments provided herein enable personalized greetings to be presented to a user by way of a personal digital assistant on a client device. Personalized greetings are generated by a personalized greetings engine using user-specific information and contextual information associated with the user. For example, an out of the ordinary event, an especially busy day for the user, the user's birthday, a win by the user's favorite sporting team, unusual weather, the user's geo-location being different than normal, etc., may be used in the generation of personalized greetings. Once one or more personalized greetings are generated, they may be ranked and communicated to the client device for presentation to the user. The client device may also perform a ranking operation on the personalized greetings to ensure that the most up-to-date information on the user has been considered.

BRIEF DESCRIPTION OF THE DRAWINGS

The embodiments described herein are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments provided herein enable personalized greetings to be generated based on user-specific information and contextual information associated with a user. Personalized digital assistants have been used in the past in attempts to mimic a human assistant. Generating personalized greetings that take into account the user's personality, location, culture, interests, etc., as described herein, greatly improves the user's experience when using the digital assistant. In one instance, a user launches a personal digital assistant on the user's client device. Once launched, a request is sent from the client device to a server that interacts with a personalized greetings engine to gather relevant, user-specific data to generate the personalized greetings for that particular user. In embodiments, information about the user's preferences, interests, inferences, schedule, travel, birthday, anniversary, etc. is retrieved. Also, contextual information, such as information about an event associated with the user that is out of the ordinary, may also be used by querying one or more services, whether internal of third party services, to retrieve this information. Personalized greetings are generated on the server side so that newer greetings can be pushed down from the server as the user's context changes. Advantageously, this minimizes computation on the client device, which, in the case of smart phones, can be resource intensive. In alternative scenarios, personalized greetings may also be generated on the client side, such as by software coded on the client device, or by a component associated with the personal digital assistant.

As will be described herein, a personalized greeting system is utilized to generate personalized greetings to provide an enhanced user experience when a user runs a personal digital assistant on a client device. The personalized greeting system generally refers to all components on the server side that are involved in generating the personalized greetings. In embodiments, this may include a server, a personalized greetings engine, a user profile database, services, etc.

Personalized greetings, as used herein, refer to any form of communication, including text, images, videos, audio, etc., that can be presented to a user on a client device. Some personal digital assistants are able to communicate audio, so that the personalized greetings are audible to the user. Textual messages could also be used to communicate the personalized greetings to the user, either alone or in combination with the audio.

As will be discussed further herein, users may have multiple devices that are used to access a personal digital assistant on a daily, weekly, monthly, etc., basis. Personal digital assistants may also be referred to herein as digital assistants. A goal of the personalized greeting system described herein is to mimic a human experience with the user. Providing the same greeting to the user twice in one day is not typical of how the user would be greeted by a human. As such, embodiments provide for mechanisms to alternate or rotate through a list of personalized greetings so that the experience is heightened for the user. For example, If the user accesses his/her laptop in the morning, and his/her mobile device in the afternoon on the day of the user's birthday, the system would know to now greet the user with "Happy Birthday!" both times, but rather to greet the user the first time with "Happy Birthday!" and greet the user the second time with "Hope you are having a wonderful day!" Additionally, the personalized greetings system and/or the client device include a ranking system that can use user information to rank the personalized greetings based on prioritization of the user's interest. For instance, it may be determined that the user has a greater interest in sports over weather (e.g., based on user searching, e-mails, calendar entries). With this, a personalized greeting that is directed to sports may be ranked higher than one directed to the weather. The information used for ranking could be static or dynamic. Even further, two or more personalized greetings could be combined and presented to the user as a single greetings, such as, for example, "Welcome Home! The temperature is expected to be above 85 today!"

An additional advantage of embodiments presented herein is that the client device is not required to communicate a request each time a personalized greeting is needed, such as when a user launches his/her personal digital assistant. Instead, multiple personalized greetings may be generated and communicated to and cached on the client device so that the client device can cycle through those without having to reach out to the server each time. This creates an increased efficiency on both the client side and the server side. One way this can be accomplished so that stale or out-of-date personalized greetings are not presented to the user is to tag or associate each personalized greeting with an expiration date. As such, each personalized greeting sent to the client device may be either active or expired. In one embodiment, only active personalized greetings are presented to the user.

According to a first embodiment, a system is provided for generating personalized greetings for presentation by a personal digital assistant on a client device. The system comprises a personalized greetings engine having one or more processors and one or more computer-readable storage media. The personalized greetings engine is configured to receive an indication that a user of a client device has launched the digital assistant on the client device, and to retrieve user-specific information and contextual information corresponding to the user. This data is retrieved by querying a user profile database for the user-specific information, and querying one or more services for the contextual information corresponding to the user. Further, the personalized greetings engine is configured to generate one or more personalized greetings for presentation by the digital assistant on the client device. The personalized greetings engine generates the one or more personalized greetings based on at least one of the user-specific information or the contextual information.

According to a second embodiment, one or more computer storage media having computer-executable instructions embodied thereon are provided that, when executed by one or more processors, causes the one or more processors to perform a method for generating personalized greetings for presentation by a personal digital assistant on a client device. The method comprises, at a server, receiving an indication from the client device associated with a user that the user has launched the digital assistant on the client device, and retrieving user-specific information and contextual information corresponding to the user by querying a user profile database for the user-specific information, and querying one or more services for the contextual information corresponding to the user. The method further comprises, by way of a personalized greetings engine, generating a personalized greeting that is presented by the digital assistant on the client device, wherein the personalized greeting engine generates the personalized greeting based on one or more of the user-specific information or the contextual information.

According to a third embodiment, a computer-implemented method for generating a personalized greeting presented by a digital assistant on a client device is provided. The method comprises receiving, at a personalized greeting engine, a request to generate one or more personalized greetings that are unique to a user of the client device, where the user has launched the digital assistant on the client device. The method also comprises querying a user profile database to retrieve user-specific information and querying one or more services to retrieve contextual information that corresponds to an event associated with the user. Further, the method comprises, by way of the personalized greetings engine, generating the one or more personalized greetings, where at least one of the one or more personalized greetings are presented to the user by the digital assistant on the client device, and ranking the one or more personalized greetings retrieved from the user profile database and the one or more services. Even further, the method comprises communicating a ranked set of personalized greetings to the client device.

Figure 1:
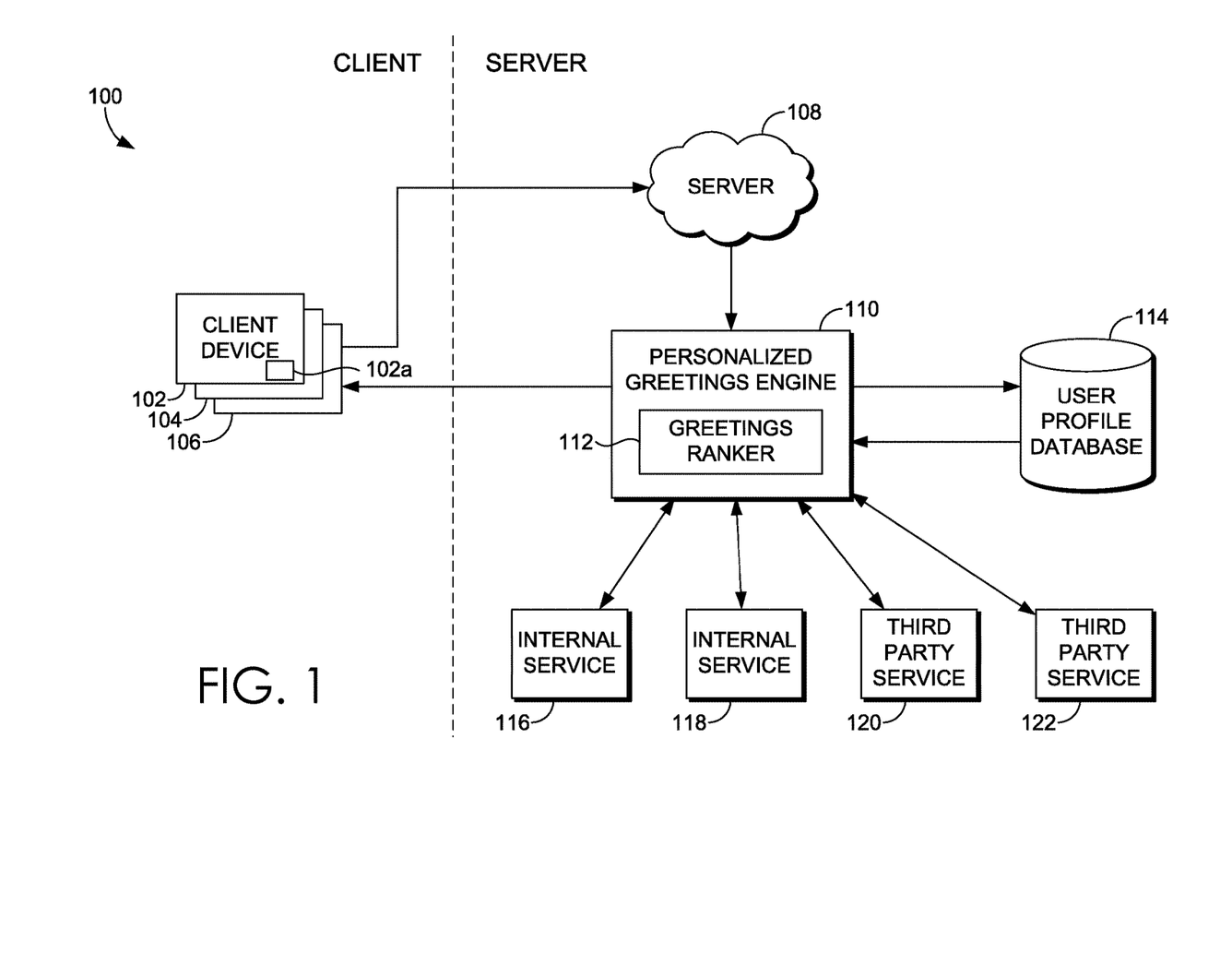
FIG. 1 is a block diagram of an exemplary operating environment in which embodiments described herein may be employed.

Turning now to FIG. 1, a block diagram 100 is illustrated of an exemplary operating environment in which embodiments described herein may be employed. As shown here, there are multiple client devices (items 102, 104, and 106) on the client side of the block diagram 100. Each of these client devices could be any type of computing device, such as computing device 600 described herein in relation to FIG. 6. Using client device 102 as an example, client device 102 may include code that can be used to run a personal digital assistant program 102a. A personal digital assistant program, also termed herein a digital assistant, is a program that provides services traditionally provided by a human assistant. Exemplary services include updating a calendar, providing reminders, tracking activities, etc. Digital assistants may respond to voice commands or typed commands, and may provide typed or audible responses. In embodiments herein, a digital assistant, such as the digital assistant 102a running on client device 102, is able to provide personalized, unique greetings to the user of the client device 102 by utilizing user-specific information and contextual information associated with the user. Using this information, personalized greetings are generated.

The server side of block diagram 100 includes a server 108, a personalized greetings engine 110, a user profile database 114, internal services 116 and 118, and third party services 120 and 122. Initially, a client device, such as one of client devices 102, 104, or 106, communicates a request to the server 108 indicating that the user has launched the digital assistant on the client device. The server 108 communicates this request to the personalized greetings engine 110. The personalized greetings engine 110 has access to at least one information source having information corresponding to the user of the client device 102. For instance, as shown in FIG. 1, these information sources include the user profile database 114, one or more internal services (items 116 and 118), and one or more third party services (items 120 and 122). In one instance, user inferences, suggestions, interests, shadow calendar, etc., are stored in the user profile database 114. The personalized greetings engine 110 reads and parses this information from the user profile database 114. For example, one type of information stored in the user profile database 114 may be the user's birth date. The personalize greetings service is able to perform some computations, such as comparing the user's birth date to the current date, to determine if today is the user's birthday. In this case, if the user's birth date and the current date match, one type of personalized greeting generated may be a "Happy Birthday" message along with a birthday cake animation. Another type of personalized greeting generated may be "Good morning Samuel. Today looks like it will be a busy day for you," or "Busy day ahead. Take a deep breath and remember to take breaks between meetings," both of which could have been based on the user having multiple meetings on his calendar on that particular day.

In addition to accessing user-specific information from the user profile database 114, the personalized greetings engine 110 may also have access to one or more internal services (items 116 and 118) and one or more third party services (items 120 and 122) to collect a set of out of the ordinary events, which may be used to greet the user. An out of the ordinary event may include, for example, a vacation or business trip taken by the user, a sporting game won by the user's preferred sporting teams, unusual weather, the user's birthday, etc. Examples of internal services and third party services include a weather service to provide data on the current or projected weather conditions in a particular geographical area, a sports service to provide data on current scores or news related to sporting events, a travel service to provide data on any type of travel issues, etc. For examples, the weather service may know the user's current or future geo-location, and if the weather is out of the ordinary or different than normal in those locations, the system could retrieve that information and use it to generate a personalized greeting that would be relevant and customized to the user. As mentioned, these types of services may be internal to the provider of the personalized greetings, or may be external, such as a third party service. In one instance, a third party service or application may use context it acquires about the user to insert a greeting into the list of greetings used by the digital assistant. The digital assistant program would make the final decision as to whether that personalized greeting would be used.

The personalized greetings engine 110 comprises a greetings ranker 112, which is generally responsible for ranking a plurality of generated personalized greetings to determine which should be presented to the user by the client device. While this ranking may be performed by the greetings ranker 112, a ranking system on the client device may also have the capability of ranking the generated personalized greetings. In one instance, both the greetings ranker 112 and the digital assistant 102a on the client device 102 rank the personalized greetings. For instance, the greetings ranker 112 may do a preliminary ranking, followed by a final ranking by the digital assistant 102a. The digital assistant 102a may have some user information that has not yet been stored in the user profile database 114, for example, that it may use to reorder the ranking performed by the greetings ranker 112. In other instances, either the greetings ranker 112 or the ranker on the digital assistant 102a may be used alone to rank the personalized greetings.

With continued reference to the ranking of personalized greetings either by the greetings ranker 112 or the digital assistant 102a, either ranking system may rank based on intelligence gathered by the ranker on the user. For instance, a goal of the personalized greetings system is to show personalized greetings at the right time and right place. As such, embodiments enable the ranking system to have the intelligence to rank the personalized greetings to determine which greetings may be most time/place appropriate to present to the user. For instance, if the system knows that the user has had a stressful day based on that user having many meetings on her calendar, a greeting such as "Busy day ahead . . . take a deep breath and remember to take breaks in between meetings" may trump a weather related greeting, such as "It's super chilly today!" As such, the personalized greetings system is able to determine which event at that particular time trumps other events, and thus can determine which personalized greeting to rank higher than others. In addition, if multiple greetings rank high on the list of generated personalized greetings, multiple greetings can be combined and presented to the user. For example, a combined greeting such as "Welcome home! Brace yourself and stay hydrated today—the mercury is going to rise above 90 degrees today!" may be selected if the user has just returned home from a business trip or a vacation, and there are presently unusually high temperatures at the user's location.

Once the personalized greetings have been generated, and in some instances, have been ranked, this set of personalized greetings is communicated back to the client device for presentation to the user. As mentioned, multiple personalized greetings may be sent to the client device at one time and cached on the client device. This is advantageous, as the client device does not have to request personalized greetings from the server each time the digital assistant is launched by the user. While having advantages in not requesting a personalized greeting from the server each time one is needed, the digital assistant 102a also does not want to present old or outdated greetings to the user. For example, it would be confusing to the user to receive a happy birthday message on the day after his/her birthday. As such, embodiments allow for each personalized greeting to have an expiration date, after which the expired personalized greeting would not be presented to the user. Therefore, personalized greetings sent to the client device may be either active or expired. During the period of time while a personalized greeting is active, the client device is free to choose that personalized greeting to present to the user. But when a personalized greeting has become inactive, or expired, that personalized greeting is removed from the client device's queue of greetings to present to the user. In addition to an expiration date, one or more of the personalized greetings may have a geo-location associated therewith in which to trigger the presentation of that personalized greeting. A greeting relating to a first location that the user frequents may not apply to a second location where the user is visiting.

In embodiments, a user may have multiple client devices that he/she uses. For example, a user may use a tablet, a mobile device, and a laptop on a particular day or during a particular week. When multiple surfaces are used in which the digital assistant can be utilized by the user, embodiments herein provide that the various devices/surfaces know about each other and coordinate amongst themselves to provide relevant personalized greetings. This coordination may be done with or without the server 108. For example, the user's experience with the digital assistant would be improved if the user was not presented with a birthday greeting multiple times on the user's birthday. Once the user has received the birthday greeting the first time, the other devices/surfaces would know to select a different personalized greeting generated for that user. Because the goal is for the digital assistant to imitate what a human assistant would say and do, a human assistant would not greet the user with the exact same birthday greeting multiple times in a day, and thus, the digital assistant would not either.

Also, multiple personalized greetings sent to the client device may rotate so that the same greeting is not presented to the user multiple times. As such, the greetings may be multi-turn. For example, if the user was wished "Happy Birthday," the next greeting after a few hours could be "Hope your day is going great!" This second greeting may be presented on the same surface/device or on a different one that the user is using at the later time. This allows for a seamless user experience across all devices so that the personalized greetings system appears as a single entity that is connected across all devices and surfaces.

While there are an unlimited number of personalized greetings that may be generated, as each is unique and based on user-specific information and context, the following provides several exemplary scenarios and resulting personalized greetings that could be generated using aspects provided herein. A first scenario is that the user has an upcoming vacation planned to Hawaii. The personalized greetings engine 110 is able to infer this by accessing, for instance, the user profile database 114 so that when the user arrives in Hawaii, the user is greeted with "Aloha," the current forecast for Hawaii, or a similar personalized greeting. Another scenario is that the user's favorite sporting team has won a game. The system already knows which teams are favored by the user, and is thus able to generate a personalized greeting, such as "Congratulations that the Seahawks won last night" or "How about that game yesterday!" Another scenario is that the system knows the user's current location. Based on current weather conditions, such as weather conditions retrieved from an internal service (items 116 or 118), the personalized greetings engine 110 may generate a greeting, such as "It's super-hot today!" As mentioned, the personalized greeting system may infer that the user has been gone for a long trip, such as on business or for vacation. When the user returns home, the personalized greetings engine 110 is able to generate a greeting, such as "Welcome home!" A last example is that the system may infer that the user has visited a fitness center three times a week. The personalized greetings engine 110 may generate a motivational greeting to the user, such as "Hey Samuel, keep up the good work!" As the inference system evolves and starts to see more and more inferences about the user, the personalized greetings system can leverage these inferences to generate a higher level of personalized greetings to present to the user.

Figure 2:
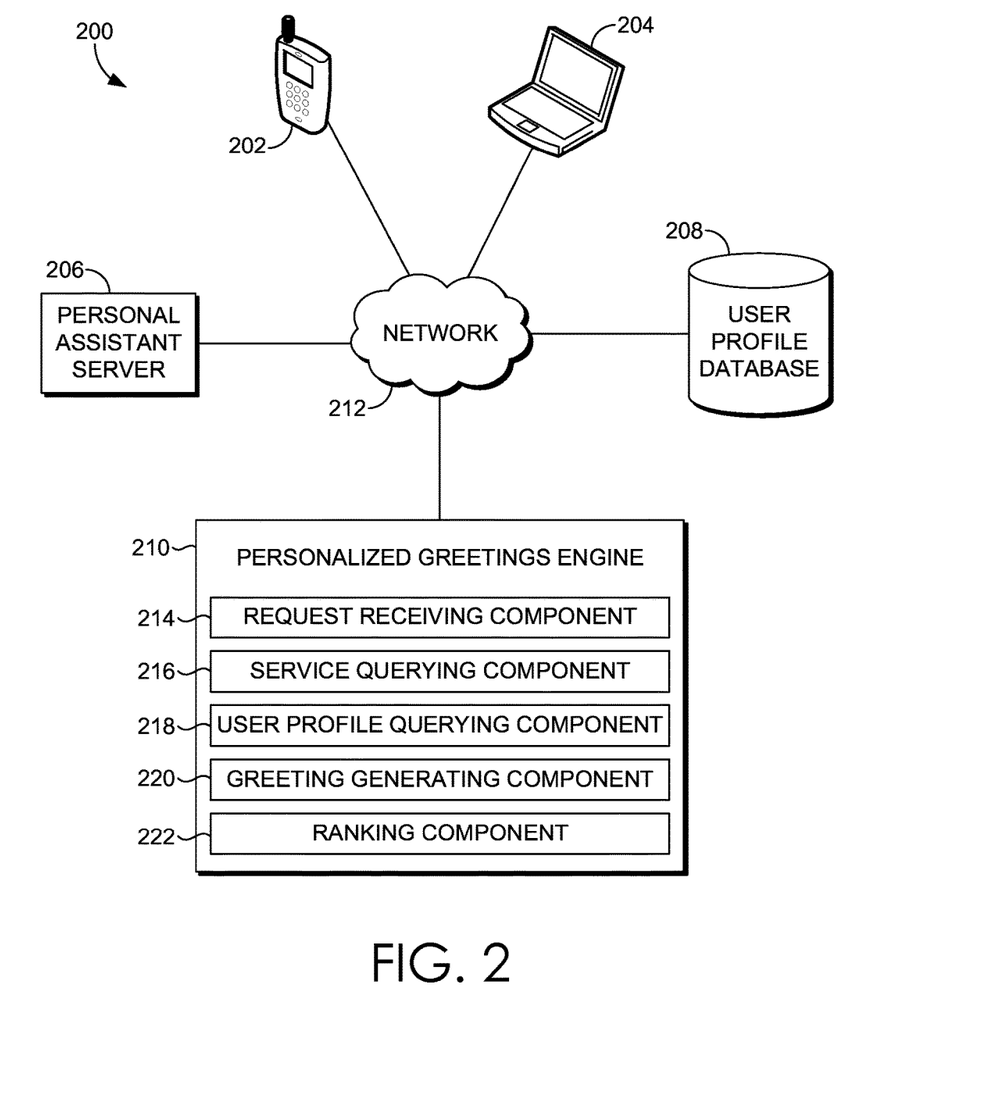
FIG. 2 is a diagram of an exemplary system in which embodiments described herein may be employed.

FIG. 2 is a diagram of an exemplary system 200 in which embodiments described herein may be employed. The system 200 of FIG. 2 comprises a first client device 202, a second client device 204, a personalized assistant server 206, a user profile database 208, and a personalized greetings engine 210. The client devices are connected to the other components illustrated in FIG. 2 by way of a network 212, which may take the form of a wide area network, the Internet, etc. As mentioned, the digital assistant located on a client device communicates a request through the network 212 to the personal assistant server 206, which retrieves user-specific information and context associated with the user from the user profile database 208 and the personalized greetings engine 210.

The personalized greetings engine 210 was discussed in relation to FIG. 1, but will be discussed here in more detail. The personalized greetings engine 210 includes various components, including a request receiving component 214, a service querying component 216, a user profile querying component 218, a greeting generating component 220, and a ranking component 222. The request receiving component 214 may take the form of a server or some other network component, and is generally responsible for receiving requests from client devices to provide personalized greetings that are customized and unique to that particular user. The service querying component 216 is generally responsible for querying the services available, such as internal services or external/third party services. As mentioned, when an event associated with the user is out of the ordinary for that user, the services can provide related information, such as weather information in a particular location where the user is visiting, the score from a sporting game won by the user's favorite team, etc. In one embodiment, the services discussed herein may store contextual information. In another embodiment, the services may generate the contextual information from user-specific information. In yet another embodiment, the services may both generate and store the contextual information. The user profile querying component 218 queries the user profile database 208 for user-specific information, which is used, at least partially, to generate the personalized greetings.

The greeting generating component 220 is generally responsible for generating personalized greetings using the user-specific information and contextual information associated with the user. There are many ways in which the personalized greetings can be generated. For instance, in some embodiments, templates are used for different categories or events so that user-specific information is inserted into these templates to form a unique and customized greeting. For example, if the user has just returned home from vacation, the template may be <Welcome home, [name]>. Or if the user has arrived in a city that is different from his/her hometown, an exemplary template is <You are going to have a great time in [city], the weather is fantastic today!>.

The ranking component 222 is responsible for ranking the generated personalized greetings. As discussed above, in addition to the ranking component 222 in the personalized greetings engine 210, the client device may also have a ranker that can re-rank or further refine the rankings provided by the ranking component 222. These rankers may be used individually or in combination. In some embodiments, the ranking component 222 statically ranks the personalized greetings, but in other embodiments, the ranking component 222 dynamically ranks the personalized greetings. An example will be provided to distinguish between static and dynamic ranking. For static ranking, one category or event may be statically ranked higher than another category or event such that until that static priority of categories or events is changed, each personalized greeting will have that static priority information applied to it. For instance, for a particular user, it may have been determined that sports are of more interest than the weather, and as such, sports-related greetings may be ranked higher than weather-related greetings in every instance until this priority information is changed. To the contrary, dynamic ranking allows the ranking system to learn about the user over time such that the priority information can be constantly modified. At one particular time, travel may be determined to be more important to a user than weather, but under certain conditions (e.g., bad weather, big win for the user's favorite sports team, the first vacation taken by the user in a long time), personalized greetings associated with other categories may be ranked higher.

Figure 3:
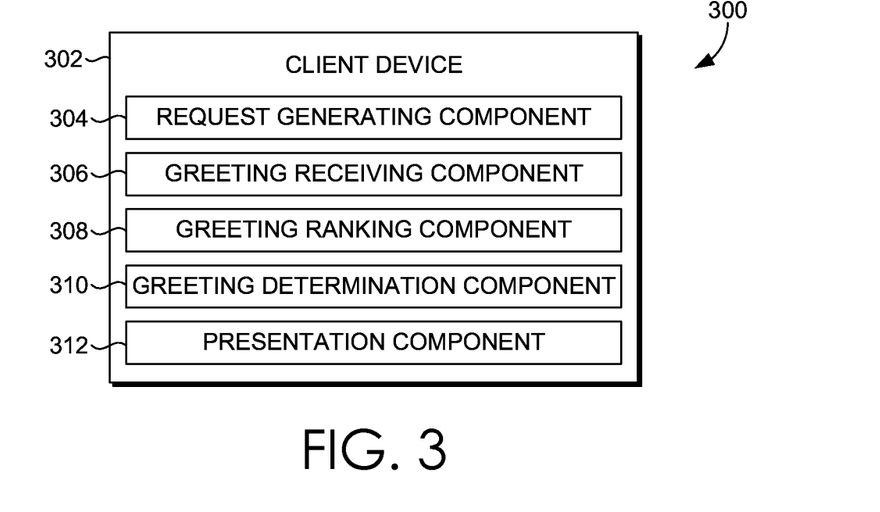
FIG. 3 is a diagram of exemplary components of a client device, in accordance with embodiments described herein.

Turning now to FIG. 3, a diagram 300 is illustrated of exemplary components of a client device 302, in accordance with embodiments described herein. The client device 302 comprises a request generating component 304, a greeting receiving component 306, a greeting ranking component 308, a greeting determination component 310, and a presentation component 312. The request generating component 304 is generally responsible for generating a request and sending the request for personalized greetings to the server. A request may be sent, for example, after the user has launched the personal digital assistant on the client device. In other instances, the request may be sent to the server for personalized greetings without the user having launched the personal digital assistant on the client device.

The greeting receiving component 306 receives the personalized greetings generated by the personalized greetings engine, such as the personalized greetings engine 110 or 210 of FIGS. 1 and 2, respectively. Once received, in some embodiments, the greeting ranking component 308 may perform a ranking operation on the personalized greetings received. As mentioned, the personalized greetings may be ranked on the server side or on the client side, or both. The client device may have up-to-date information on the user that can be used to better rank the personalized greetings. The greeting determination component 310 uses the ranked set of personalized greetings to determine which personalized greeting to present to the user, in which order to present the greetings, and can ensure that the same greeting is not presented to the user both on the same device and across other devices associated with the user to create a seamless user experience. The presentation component 312 on the client device 302 enables the personalized greetings to be presented to the user. The personalized greetings may be only in written form on the display of the client device 302 (e.g., text only greetings), may only be audible and not in written form (e.g., images, videos, audio of the text), or may be both in written form and audible. Other methods for presenting the personalized greetings to the user are also contemplated to be within the scope of aspects provided herein.

Figure 4:
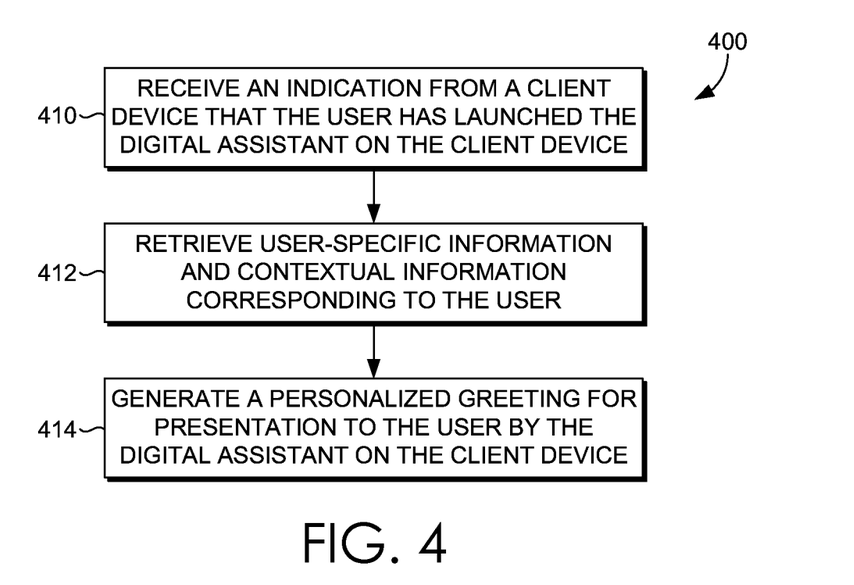
FIG. 4 is a flow diagram showing an exemplary method for generating personalized greetings for presentation by a personal digital assistant on a client device, in accordance with embodiments described herein.

FIG. 4 is a flow diagram showing an exemplary method 400 for generating personalized greetings for presentation by a personal digital assistant on a client device, in accordance with embodiments described herein. Initially, at a server, an indication is received from the client device associated with a user that the user has launched the personal digital assistant on the client device, shown at block 410. This indication may take the form of a request. At block 412, user-specific information and contextual information corresponding to the user is retrieved. A user profile database may be queried for the user-specific information, and one or more services may be queried for the contextual information corresponding to the user. By way of a personalized greetings engine, one or more personalized greetings are generated for presentation by the digital assistant on the client device, shown at block 414. The personalized greetings engine generates the personalized greetings based on one or more of the user-specific information or the contextual information.

As used herein, the user-specific information may include user inferences, suggestions, user interests, voicemails, recent calls, e-mails, text messages, calendar information, browser information (e.g., previous searches performed by the user), recently viewed web pages, content of applications on the client device, and any other information that can be derived from the user's interaction with the client device. For example, if a user frequently searches for different models of cars, the system may infer that cars are of particular interest to a user. In this example, if there is a breaking news story about a car, or the system sees on the user's calendar that the user has an appointment to go test drive a car, a personalized greeting directed to either of these events would be of interest to the user. Contextual information associated with the user that is retrieved from one or more services, whether internal or third party services, provides data on out of the ordinary events that the user may be experiencing. This could include unusual weather conditions, scores of sporting events, the user traveling to a new location, etc. There are several categories of contextual information, including social, historic, task, collection, and user interactions. The third party services may deliver contextual information to the system that can be used by the system to generate personalized greetings. However, in another embodiment, the third party services, or even the internal services, have the capabilities to use contextual information and use this information to generate personalized greetings that can be used and ranked by the personalized greetings system.

Figure 6:
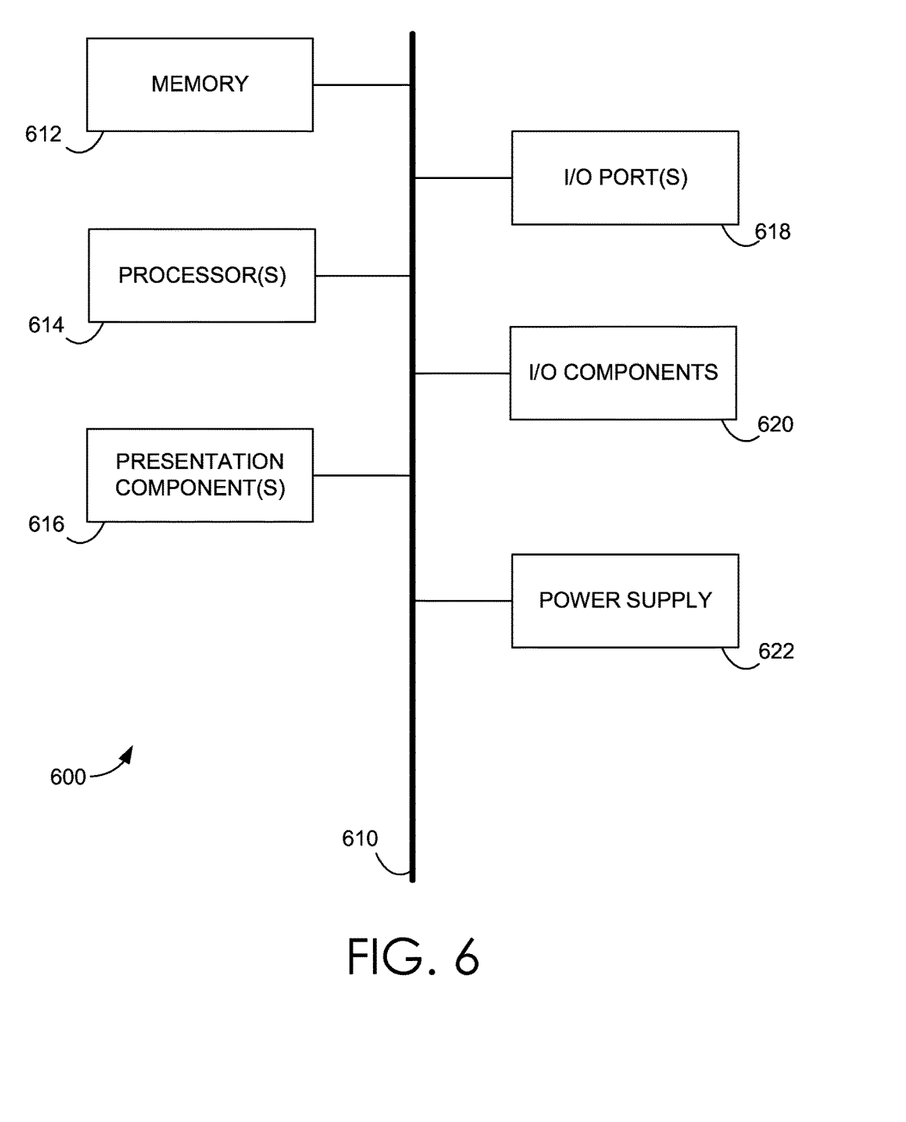
FIG. 6 is a block diagram of an exemplary computing environment suitable for use in implementing embodiments described herein.

As mentioned, in embodiments, the user may have more than one device that he/she uses on a regular basis, such as a tablet, a PC, a mobile device, a watch, glasses, bands, car dashboard systems, and any other device that is capable of performing computing functions, such as those described in relation to FIG. 6 herein. In this case, the multiple devices may coordinate amongst each other to provide a variation of personalized greetings to the user such that the same personalized greeting is not presented to the user more than once in a day or other such period of time. In one instance, the devices are able to communicate with one another by way of the personalized greeting engine or other personalized greetings system component. In still other embodiments, the personalized greeting presented to the user may be a combination of two or more personalized greetings, such as "Welcome home! It is a beautiful sunny day today!"

Figure 5:
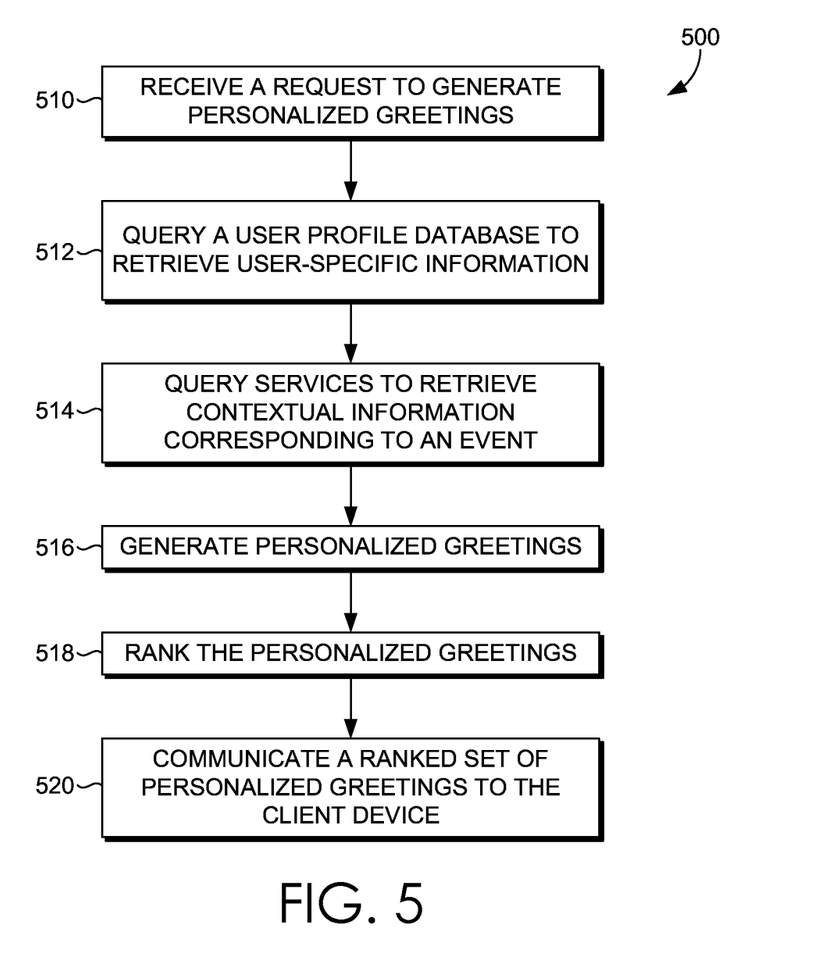
FIG. 5 is a flow diagram showing an exemplary method for generating personalized greetings for presentation by a personal digital assistant on a client device, in accordance with embodiments described herein.

Referring to FIG. 5, a flow diagram is depicted showing an exemplary method 500 for generating personalized greetings for presentation by a personal digital assistant on a client device, in accordance with embodiments described herein. Initially, at block 510, a request to generate personalized greetings is received, such as at a server or a personalized greetings engine. At block 512, a user profile database is queried to retrieve user-specific information, and at block 514, one or more services are queried to retrieve contextual information that corresponds to an event associated with a user. The one or more services may be internal or third party services. In the case of third party services, a third party application may acquire user context or other user information to provide suggested personalized greetings to the personalized greetings engine.

By way of the personalized greetings engine, one or more personalized greetings are generated, shown at block 516. To generate the personalized greetings, user-specific information and contextual data are transformed into greetings. In one instance, user-specific information and contextual data may be incorporated into pre-created templates to generate the personalized greetings, or the personalized greetings may be generated without the user of pre-created templates. At block 518, the personalized greetings are ranked so that greetings associated with subjects or events more important to the user are ranked higher than other greetings. A ranked set of personalized greetings are communicated to the client device at block 520. In embodiments, the client device also ranks the ranked set of personalized greetings based on user information known by the client device, such as up-to-date information. The client device may utilize the ranked set of personalized greetings without having to communicate subsequent requests to the personalized greetings engine until the personalized greetings have expired or are close to expiring. As mentioned, each personalized greeting, in embodiments, has an associated expiration date. As such, a personalized greeting may be categorized as active or expired.

It is noted that while embodiments described herein use user-specific information to generate personalized greetings, the user may have the option to opt-in or opt-out of the use of their personal information, as described herein. As such, for users who choose to opt-out, the system may still present greetings to the user, but the greetings would not be personalized, but instead may be generic greetings.

Having briefly described an overview of embodiments of the present invention, an exemplary operating environment in which embodiments described herein may be implemented is described below in order to provide a general context for various aspects of the present invention. Referring initially to FIG. 6 in particular, an exemplary operating environment for implementing embodiments described herein is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may coexist with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Embodiments presented herein have been described in relation to particular embodiments which are intended in all respects to be illustrative rather than restrictive. It will be understood that certain features and sub-combinations are of utility and may be employed without reference to other features or sub-combinations. This is contemplated by and is within the scope of the claims.

What is claimed is:

1. A system for generating personalized greetings for presentation by a personal digital assistant on a client device, the system comprising:
 a personalized greetings engine having one or more processors and one or more computer-readable storage media, the personalized greetings engine configured to:
 receive an indication that a user of a client device has launched the digital assistant on the client device,
 retrieve user-specific information and contextual information corresponding to the user by,
 (1) querying a user profile database for the user-specific information, and
 (2) querying one or more services for the contextual information corresponding to the user,
 using the contextual information corresponding to the user to determine a type of personalized greeting to generate, and
 based on the determined type of personalized greeting, generate one or more personalized greetings for presentation by the digital assistant on the client device,
 wherein the personalized greetings engine generates the one or more personalized greetings based on at least one of the user-specific information or the contextual information; and
 a server having one or more processors and one or more computer-readable storage media, the server configured to:
 communicate a request for the one or more personalized greetings from the client device to the personalized greetings engine, and
 coordinate with at least one other client device that is associated with the user to determine that the type of personalized greeting to be generated has not already been generated for presentation by the digital assistant on the client device within a preceding particular time period, wherein the server communicates with the client device and the at least one other client device.

2. The system of claim 1, wherein the user profile database stores the user-specific information.

3. The system of claim 1, wherein the one or more services generate the contextual information corresponding to the user.

4. The system of claim 1, wherein the personalized greetings engine comprises a greetings ranker that ranks the one or more personalized greetings.

5. The system of claim 4, wherein the greetings ranker generates a ranked set of personalized greetings.

6. The system of claim 5, wherein the personalized greetings engine is further configured to communicate the ranked set of personalized greetings to the client device for presentation to the user by the digital assistant.

7. The system of claim 1, wherein generating the personalized greeting further comprises:
 determining an event associated with the at least one of the user-specific information or the contextual information; and
 incorporating information associated with the event into a pre-created template.

8. One or more computer storage media having computer-executable instructions embodied thereon that, when executed by one or more processors, causes the one or more processors to perform a method for generating personalized greetings for presentation by a personal digital assistant on a client device, the method comprising:
 at a server, receiving an indication from the client device associated with a user that the user has launched the digital assistant on the client device;
 retrieving user-specific information and contextual information corresponding to the user by,
 (1) querying a user profile database for the user-specific information, and
 (2) querying one or more services for the contextual information corresponding to the user;
 using the contextual information corresponding to the user, determining a type of personalized greeting to generate;
 coordinating with at least one other client device that is associated with the user to determine that the type of personalized greeting to be generated has not already been generated for presentation by the digital assistant on the client device within a preceding particular time period, wherein the server communicates with the client device and the at least one other client device;
 communicating a request for the a personalized greeting from the client device to a personalized greetings engine; and by way of the personalized greetings engine and based on the determined type of personalized greeting, generating the personalized greeting that is presented by the digital assistant on the client device, wherein the personalized greetings engine generates the personalized greeting based further on one or more of the user-specific information or the contextual information.

9. The media of claim 8, wherein the user-specific information comprises inferences and interests of the user.

10. The media of claim 8, wherein the contextual information is data corresponding to out of the ordinary events that the user is experiencing.

11. The media of claim 8, wherein the client device is a first client device, and wherein the user is also associated with a second client device.

12. The media of claim 11, wherein the first client device and the second client device coordinate amongst each other to provide a variation of personalized greetings to the user.

13. The media of claim 11, wherein the personalized greetings engine coordinates with the first client device and the second client device to provide a variation of personalized greetings to the user.

14. The media of claim 8, wherein the personalized greeting generated by the personalized greeting engine is a combination of two individual personalized greetings.

15. A computer-implemented method for generating a personalized greeting presented by a digital assistant on a client device, the method comprising:
  receiving, at a personalized greetings engine, a request to generate one or more personalized greetings that are unique to a user of the client device, where the user has launched the digital assistant on the client device;
  querying a user profile database to retrieve user-specific information;
  querying one or more services to retrieve contextual information that corresponds to an event associated with the user;
  determining a type of personalized greeting to generate based on the contextual information;
  at a server in communication with the personalized greetings engine and the client device, coordinating with at least one other client device that is associated with the user to determine that the type of personalized greeting to be generated has not already been generated for presentation by the digital assistant on the client device within a preceding particular time period, wherein the server communicates with the client device and the at least one other client device;
  by way of the personalized greetings engine and based on the determined type of personalized greeting, generating the one or more personalized greetings, where at least one of the one or more personalized greetings is presented to the user by the digital assistant on the client device;
  ranking the one or more personalized greetings generated by the personalized greetings engine; and
  communicating a ranked set of personalized greetings to the client device.

16. The method of claim 15, wherein the client device also ranks the ranked set of personalized greetings communicated by the personalized greetings engine based on user information known by the client device.

17. The method of claim 15, wherein at least one of the one or more personalized greetings is provided by a third party application based on user context acquired by the third party application.

18. The method of claim 15, wherein the client device utilizes the ranked set of personalized greetings without having to communicate subsequent requests to the personalized greetings engine until the ranked set of personalized greetings has expired.

19. The method of claim 18, wherein each personalized greeting of the ranked set of personalized greetings has a corresponding expiration date, after which the client device does not present the personalized greeting that has expired to the user.

20. The method of claim 15, wherein the event is one or more of a sporting event, an event on the user's calendar, a geographic location of the client device that is different than the user's home location, a weather event, or a birthday.

* * * * *